(12) United States Patent
Kakitsu et al.

(10) Patent No.: US 7,907,094 B2
(45) Date of Patent: Mar. 15, 2011

(54) PORTABLE TERMINAL APPARATUS

(75) Inventors: Haruhiko Kakitsu, Shizuoka (JP);
Hideo Nakanishi, Kanagawa (JP);
Takahiro Ochi, Shizuoka (JP)

(73) Assignee: Panasonic Corporation, Osaka (JP)

( * ) Notice: Subject to any disclaimer, the term of this patent is extended or adjusted under 35 U.S.C. 154(b) by 359 days.

(21) Appl. No.: 12/159,108

(22) PCT Filed: Jan. 20, 2006

(86) PCT No.: PCT/JP2006/300879
§ 371 (c)(1),
(2), (4) Date: Jun. 25, 2008

(87) PCT Pub. No.: WO2007/083390
PCT Pub. Date: Jul. 26, 2007

(65) Prior Publication Data
US 2010/0225543 A1 Sep. 9, 2010

(51) Int. Cl.
*H01Q 1/24* (2006.01)
*H01Q 3/24* (2006.01)
(52) U.S. Cl. .......................... 343/702; 343/876
(58) Field of Classification Search .............. 343/702, 343/876, 850, 853, 860, 861; 455/506, 78, 455/456.1, 575.1
See application file for complete search history.

(56) References Cited

U.S. PATENT DOCUMENTS
7,035,654 B2 * 4/2006 Forrester ................ 455/506
2003/0013470 A1 1/2003 Forrester

FOREIGN PATENT DOCUMENTS

| | | |
|---|---|---|
| EP | 1164709 B1 | 6/2003 |
| JP | 07-221681 | 8/1995 |
| JP | 08-321716 | 3/1996 |
| JP | 08-307303 | 11/1996 |
| JP | 2000-324029 | 11/2000 |
| JP | 2003-046407 | 2/2003 |
| JP | 2005-51808 | 6/2005 |
| JP | 2005518708 A | 6/2005 |
| WO | 0148934 A1 | 7/2001 |

OTHER PUBLICATIONS

International Search Report Dated Apr. 18, 2006.

* cited by examiner

*Primary Examiner* — Hoang V Nguyen
(74) *Attorney, Agent, or Firm* — Seed IP Law Group PLLC (57) ABSTRACT

The present invention has an object to provide a portable terminal apparatus capable of reducing that antenna characteristics of respective antenna elements are deteriorated due to antenna coupling phenomena even when a plurality of wireless communication functions are carried out at the same time by utilizing a plurality of antennas.

The portable terminal apparatus 1 of the present invention is comprised of: a first wireless unit 12 for performing a wireless communication by utilizing electromagnetic waves of a first frequency range; a second wireless unit 22 for performing a wireless communication by utilizing electromagnetic waves of a second frequency range which is different from the first frequency range; a first antenna element 11 connected to the first wireless unit 12; and a second antenna element 21 connected to the second wireless unit 22; and in the portable terminal apparatus 1, an impedance characteristic of the first antenna element 11 has a first frequency characteristic in which at least a characteristic in the first frequency range is superior than a characteristic in the second frequency range; and an impedance characteristic of the second antenna element 21 has a second frequency characteristic in which at least a characteristic in the second frequency range is superior than a characteristic in the first frequency range.

9 Claims, 6 Drawing Sheets

PORTABLE TERMINAL APPARATUS

TECHNICAL FIELD

The present invention is related to a portable terminal apparatus having a plurality of antennas. More specifically, the present invention is directed to such a portable terminal apparatus for simultaneously performing the plurality of wireless communication functions by utilizing the plurality of antennas.

BACKGROUND ART

Among recent portable terminal apparatuses such as portable telephones, certain types of portable terminal apparatuses have contained therein a plurality of antennas. These portable terminal apparatuses equipped with the plural antennas are operated to perform wireless communications in such a manner that signal reception levels of antenna elements thereof are measured, and then, the wireless communications are carried out by utilizing such an antenna element having a higher signal reception level. As a result, even when a reception characteristic of one antenna element is deteriorated, since, by utilizing another antenna element having a superior reception characteristic, a portable wireless communication can be carried out, a user of a portable telephone can continuously perform comfortable portable wireless communications under better wireless communication environment.

At the present stage, a major structure of such portable terminal apparatuses is given as follows: That is, while a single antenna element having the highest reception level is employed for a portable wireless communication, the remaining antenna elements are not used for the portable wireless communication. On the other hand, current portable terminal apparatuses have been gradually provided with wireless functions using wireless communications except for portable wireless communications which are utilized in telephone conversation communications and transmissions/receptions of E-mails, while the first-mentioned wireless functions are known as, for instance, a television receiving function, a GPS (Global Positioning System) function, a wireless communication function with respect to a non-contact IC, a short distance wireless communication function with respect to an external apparatus using a short distance wireless technique (Bluetooth etc.), and the like. As a consequence, the below-mentioned portable terminal apparatuses have been so far required. That is, while the above-described remaining antenna elements are employed so as to perform such wireless communications as the television receiving function, the GPS function, the wireless communication function with respect to the non-contact IC, the short distance wireless communication function, and the like, a plurality of wireless communication functions using a plurality of antennas may be carried out at the same time.

In conventional portable terminal apparatuses, since such antenna elements which can be wireless-communicated only within frequency ranges utilized in wireless communications (namely, communicatable in narrow frequency range) have been separately provided with respect to each of these wireless communication functions, various sorts of these wireless communication functions have been carried out. However, as previously explained, in order to perform the plurality of wireless communication functions by utilizing the plurality of antenna elements at the same time, when the reception levels are low, there are some possibilities that the respective plural antennas execute various sorts of the above-explained wireless communications other than the portable wireless communications. Accordingly, these antenna elements whose reception levels are low are required to be wireless-communicatable in the respective frequency ranges utilized in these plural wireless communications (namely, these antenna elements must be operable in broad band). However, when wireless communications are carried out at the same timing by employing a plurality of broadband antenna elements, such an event may occur. That is, antenna characteristics of the respective antenna elements are deteriorated due to antenna coupling phenomena, for instance, wireless electromagnetic waves having such a frequency range which should be received by a certain antenna element are also received by another antenna element.

On the other hand, a patent publication 1 and a patent publication 2 describe wireless appliances having the below-mentioned structures: That is, while a plurality of antennas are built in these wireless appliances, signal reception levels of these plural antenna elements are measured; a portable wireless communication is carried out by utilizing a first antenna element having the highest reception level; and on the other hand, an influence caused by a second antenna element whose reception level is low can be reduced which is given to an antenna characteristic of the first antenna element. However, the second antenna element of this wireless appliance structure does not perform a portable wireless communication. As a consequence, the patent publication 1 and the patent publication 2 never solve such a problem that the antenna characteristics of the respective antenna elements are deteriorated due to the antenna coupling phenomena, which should be solved by the present invention.

Patent Publication 1: JP-A-2000-324029
Patent Publication 2: JP-A-7-221681

DISCLOSURE OF THE INVENTION

Problems that the Invention is to Solve

The present invention has been made to solve the above-described problem, and therefore has an object to provide a portable terminal apparatus capable of reducing that antenna characteristics of respective antenna elements are deteriorated due to antenna coupling phenomena even when a plurality of wireless communication functions are carried out at the same time by utilizing a plurality of antennas.

Means for Solving the Problems

A portable terminal apparatus of the present invention is featured by comprising: a first wireless unit for performing a wireless communication by utilizing electromagnetic waves of a first frequency range; a second wireless unit for performing a wireless communication by utilizing electromagnetic waves of a second frequency range which is different from the first frequency range; a first antenna element connected to the first wireless unit; and a second antenna element connected to the second wireless unit; in which an impedance characteristic of the first antenna element has a first frequency characteristic in which at least a characteristic in the first frequency range is superior than a characteristic in the second frequency range; and an impedance characteristic of the second antenna element has a second frequency characteristic in which at least a characteristic in the second frequency range is superior than a characteristic in the first frequency range.

In accordance with this structure, with respect to each of the antenna elements, since the impedance characteristic of the use frequency range has been deteriorated which is utilized by another antenna element, antenna coupling between the own antenna element and another antenna element can hardly occur. As a result, it is possible to reduce that the antenna characteristic is deteriorated.

Also, the portable terminal apparatus of the present invention is featured by that the portable terminal apparatus is comprised of: a selecting switch which connects any one of the antenna elements to the first wireless unit, and connects any one of the antenna elements, which is not connected to the first wireless unit, to the second wireless unit; and while the antenna element has a structure capable of switching the own characteristic to either the first frequency characteristic or the second frequency characteristic, when the antenna element has been connected to the first wireless unit, the characteristic of the antenna element is switched to the first frequency characteristic, whereas when the antenna element has been connected to the second wireless unit, the characteristic of the antenna element is switched to the second frequency characteristic.

In accordance with the above-described structure, when there are some differences in antenna performance (directivity, power gain etc. except for VSWR characteristic) of the respective antenna elements, a specific wireless unit having a certain wireless communication function can be connected to an antenna element having antenna performance which is suitable for this wireless communication. As a result, while the above-described effects can be maintained, the wireless communication can be carried out under more comfortable wireless communication environment.

A portable terminal apparatus, according to the present invention, is featured by comprising: a first wireless unit for performing a wireless communication by utilizing electromagnetic waves of a first frequency range; a second wireless unit for performing a wireless communication by utilizing electromagnetic waves of a second frequency range which is different from the first frequency range; a first antenna element; a second antenna element; a first impedance adjusting unit connected to the first wireless unit, for containing at least either a matching circuit or a filter, which adjusts an impedance characteristic with respect to the first antenna element; and a second impedance adjusting unit connected to the wireless unit, for containing at least either a matching circuit or a filter, which adjusts an impedance characteristic with respect to the second antenna element; in which an impedance characteristic caused by the first antenna element and the first impedance adjusting unit has a first frequency characteristic in which at least a characteristic in the first frequency range is superior than a characteristic in the second frequency range; and an impedance characteristic caused by the second antenna element and the second impedance adjusting unit has a second frequency characteristic in which at least a characteristic in the second frequency range is superior than a characteristic in the first frequency range.

In accordance with the above-described structure, for example, since the matching circuit performs the matching/adjusting operation so as to deteriorate the impedance characteristic of the specific frequency range of the antenna element, when such antenna elements utilized in the portable terminal apparatus of the present invention are designed, these antenna elements may be designed only by considering such a condition that a band width of a wireless communicatable operation by the antenna elements may contain each of the frequency ranges which are utilized in a plurality of wireless communications. As a result, the antenna elements may be designed in a simple manner.

Also, the portable terminal apparatus of the present invention is featured by that the portable terminal apparatus is comprised of: a selecting switch for connecting any one of the impedance adjusting units to the first wireless unit, and for connecting any one of the impedance adjusting units to the second wireless unit, which is not connected to the first wireless unit; and wherein: while the impedance adjusting unit can switch the own impedance characteristic to either the first frequency characteristic or the second frequency characteristic, when the impedance adjusting unit has been connected to the first wireless unit, the impedance adjusting unit switches the own impedance characteristic to the first frequency characteristic, whereas when the impedance adjusting unit has been connected to the second wireless unit, the impedance adjusting unit switches the own impedance characteristic to the second frequency characteristic.

In accordance with the above-described structure, when there are some differences in antenna performance (directivity, power gain etc. except for VSWR characteristic) of the respective antenna elements, a specific wireless unit having a certain wireless communication function can be connected to an antenna element having antenna performance which is suitable for this wireless communication. As a result, while the above-described effects can be maintained, the wireless communication can be carried out under more comfortable wireless communication environment.

Also, the portable terminal apparatus of the present invention is featured by that the portable terminal apparatus is comprised of: a selecting switch for connecting any one of the antenna elements to the first impedance adjusting unit, and for connecting any one of the antenna elements to the second impedance adjusting unit, which is not connected to the first impedance adjusting unit; the first impedance adjusting unit is capable of switching an adjusting method of an impedance characteristic in response to the antenna element connected by the selecting switch, and adjusts an impedance characteristic with respect to the first antenna element connected by the selecting switch to said first frequency characteristic; and wherein: the second impedance adjusting unit is capable of switching an adjusting method of an impedance characteristic in response to the antenna element connected by the selecting switch, and adjusts an impedance characteristic with respect to the second antenna element connected by the selecting switch to the second frequency characteristic.

In accordance with the above-described structure, when there are some differences in antenna performance (directivity, power gain etc. except for VSWR characteristic) of the respective antenna elements, a specific wireless unit having a certain wireless communication function can be connected to an antenna element having antenna performance which is suitable for this wireless communication. As a result, while the above-described effects can be maintained, the wireless communication can be carried out under more comfortable wireless communication environment.

Also, the portable terminal apparatus of the present invention is featured by that the portable terminal apparatus is comprised of: a selecting switch for connecting any one of the antenna elements to the first impedance adjusting unit, and for connecting any one of the antenna elements to the second impedance adjusting unit, which is not connected to the first impedance adjusting unit; an impedance characteristic of the first antenna element is substantially equal to an impedance characteristic of the second antenna element; the first impedance adjusting unit adjusts an impedance characteristic with respect to the first antenna element connected by the selecting switch to said first frequency characteristic; and wherein: the second impedance adjusting unit adjusts an impedance characteristic with respect to the second antenna element connected by the selecting switch to the second frequency characteristic.

In accordance with the above-described arrangement, the impedance adjusting unit need not switch the adjusting methods of the impedance characteristics with respect to each of the antenna elements to be connected, so that the structure of the impedance adjusting unit can be made simple.

A portable terminal apparatus, according to the present invention, is featured by comprising: a first wireless unit for performing a wireless communication by utilizing electromagnetic waves of a first frequency range; a second wireless unit for performing a wireless communication by utilizing electromagnetic waves of a second frequency range which is different from the first frequency range; a first antenna element connected to the first wireless unit; and a second antenna element connected to the second wireless unit; in which the first wireless unit employs an input impedance characteristic of the first wireless unit so as to adjust an impedance characteristic with respect to the first antenna element; the second wireless unit employs an input impedance characteristic of the second wireless unit so as to adjust an impedance characteristic with respect to the second antenna element; an impedance characteristic caused by the first antenna element and the first wireless unit has a first frequency characteristic in which at least a characteristic in the first frequency range is superior than a characteristic in the second frequency range; and an impedance characteristic caused by the second antenna element and the second wireless unit has a second frequency characteristic in which at least a characteristic in the second frequency range is superior than a characteristic in the first frequency range.

In accordance with the above-described structure, since the wireless unit performs the matching/adjusting operations so as to deteriorate the impedance characteristic of the specific frequency range of the antenna element, when such antenna elements utilized in the portable terminal apparatus of the present invention are designed, these antenna elements may be designed only by considering such a condition that a band width of a wireless communicatable operation by the antenna elements may contain each of the frequency ranges which are utilized in a plurality of wireless communications. As a result, the antenna elements may be designed in a simple manner.

Also, the portable terminal apparatus of the present invention is featured by that the portable terminal apparatus is comprised of: a selecting switch which connects any one of the antenna elements to the first wireless unit, and connects any one of the antenna elements, which is not connected to the first wireless unit, to the second wireless unit; the first wireless unit is capable of switching an adjusting method of an impedance characteristic in response to the antenna element connected by the selecting switch, and adjusts an impedance characteristic with respect to the first antenna element connected by the selecting switch to the first frequency characteristic; and wherein: the second wireless unit is capable of switching an adjusting method of an impedance characteristic in response to the antenna element connected by the selecting switch, and adjusts an impedance characteristic with respect to the second antenna element connected by the selecting switch to the second frequency characteristic.

In accordance with the above-described structure, when there are some differences in antenna performance (directivity, power gain etc. except for VSWR characteristic) of the respective antenna elements, a specific wireless unit having a certain wireless communication function can be connected to an antenna element having antenna performance which is suitable for this wireless communication. As a result, the wireless communication can be carried out under more comfortable wireless communication environment.

Advantage of the Invention

Even when the portable terminal apparatus of the present invention simultaneously performs the plurality of wireless communication functions by utilizing the plurality of antennas, the portable terminal apparatus can reduce that the antenna characteristics of the respective antennas are deteriorated due to the antenna coupling.

DESCRIPTION OF REFERENCE NUMERALS AND SIGNS 1 portable terminal apparatus
11, 31 first antenna element 12, 14, 34 first wireless unit
13, 33 first matching circuit
21, 41 second antenna element
22, 24, 44 second wireless unit
23, 43 second matching circuit
51, 52, 53, 54 switch
61, 62, 63, 64 control circuit
331 first antenna-purpose matching unit
332, 432 impedance element
333, 433 switch
431 second antenna-purpose matching unit

BEST MODE FOR CARRYING OUT THE
INVENTION

Portable terminal apparatuses according to embodiment modes of the present invention will now be described in detail with reference to concrete examples from a first embodiment mode to a seventh embodiment mode.

First Embodiment Mode

Figure 1:
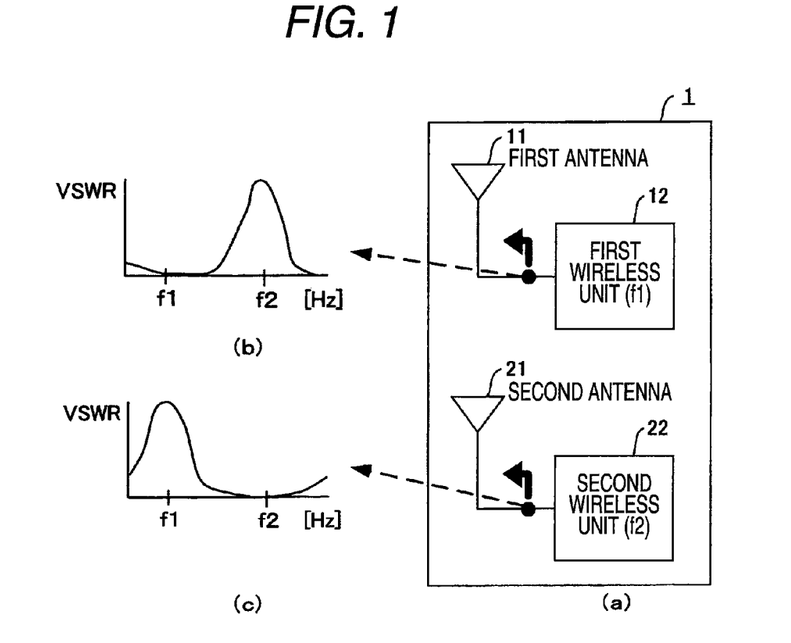
FIG. 1(a) is a structural diagram (right side of drawing) of a portable terminal apparatus according to a first embodiment mode of the present invention.
FIG. 1(b) and FIG. 1(c) indicate VSWR (Voltage Standing-wave Ratio) characteristics of antenna elements in the portable terminal apparatus of the first embodiment mode of the present invention.

A portable terminal apparatus according to a first embodiment mode of the present invention will now be described with reference to a structural diagram (right side of drawing) of the portable terminal apparatus according to the first embodiment mode of the present invention shown in FIG. 1(a), and VSWR (Voltage Standing-wave Ratio) characteristics indicated in FIG. 1(b) and FIG. 1(c).

As shown in FIG. 1(a), the portable terminal apparatus 1 according to the first embodiment mode of the present invention is arranged by containing a first antenna element 11, a second antenna element 21, a first wireless unit 12, and a second wireless unit 22.

The first wireless unit 12 and the second wireless 22 perform a wireless communication function for performing a portable wireless communication such as a telephone conversation communication and an E-mail; a wireless communication function which is utilized in a GPS system; a television function; and a wireless communication function which is utilized in a wireless system such as a short distance wireless system. Assuming now that the first wireless unit and the second wireless unit 22 perform the wireless communication functions different from each other, the first wireless unit 12 and the second wireless unit 22 therefore execute the wireless communications based upon electromagnetic waves in different frequency ranges by utilizing the antenna elements 21 and 22 which are connected to these first and second wireless units 12 and 22 respectively. It should be understood that in FIG. 1, a frequency of electromagnetic waves utilized in the wireless communication by the first wireless unit 12 is expressed as "f1", whereas a frequency of electromagnetic waves utilized in the wireless communication by the second wireless unit 22 is expressed as "f2."

The first antenna element 11 and the second antenna element 21 correspond to monopole antennas which are equipped in a resent portable terminal apparatus; and correspond to a hinge portion if a recent portable terminal apparatus constituted by 2 housings is employed, or antennas which are arranged in the vicinity of the hinge portion. It should be understood that the first antenna element 11 and the second antenna element 21 are not limited only to these antennas, but various sorts of antennas mounted on portable terminal apparatuses may be alternatively contained within an application range thereof. Also, the first antenna element 11 has a VSWR characteristic shown in FIG. 16(b). In other words, as to the first antenna element 11, an impedance characteristic in a use frequency range of the second wireless unit 22 is deteriorated in such a manner that a VSWR value is low at the frequency f1 of wireless electromagnetic waves used by the first wireless unit 12, whereas a VSWR value is high at the frequency f2 of wireless electromagnetic waves used by the second wireless unit 22. It should also be understood that if the VSWR value at the frequency f1 is smaller than, or equal to 3, then there is no practical problem.

On the other hand, it is preferable that the VSWR value at the frequency f2 is larger than, or equal to 6. Further, the second antenna element 12 has such a VSWR characteristic shown in FIG. 1(c). That is to say, as to the second antenna element 12, an impedance characteristic in a use frequency range of the first wireless unit 12 is conversely deteriorated in such a mariner that a VSWR value is high at the frequency f1 of wireless electromagnetic waves used by the first wireless unit 12, whereas a VSWR value is low at the frequency f2 of wireless electromagnetic waves used by the second wireless unit 22. It should also be understood that if the VSWR value at the frequency f2 is smaller than, or equal to 3, then there is no practical problem. On the other hand, it is preferable that the VSWR value at the frequency f1 is larger than, or equal to 6.

In accordance with the portable terminal apparatus of the first embodiment mode of the present invention, with respect to each of the antenna elements, since the impedance characteristic of the use frequency range has been deteriorated which is utilized by another antenna element, antenna coupling between the own antenna element and another antenna element can hardly occur. As a result, it is possible to reduce that the antenna characteristic is deteriorated.

It should also be understood that the first embodiment mode has described the portable terminal apparatus in which the respective antenna elements have been connected to the two wireless units. Alternatively, the first embodiment mode may be similarly applied to such a case that the respective antenna elements are connected to 3, or more sets of wireless units. That is, with respect to an antenna element, an impedance characteristic in a use frequency range of another wireless unit may be deteriorated in such a manner that a VSWR value is high at a frequency of wireless electromagnetic waves utilized by such a wireless unit to which the first-mentioned antenna element has been connected, whereas a VSWR value is low at a frequency of wireless electromagnetic waves utilized by another wireless unit to which the first-mentioned antenna element has not been connected.

Second Embodiment Mode

A portable terminal apparatus according to a second embodiment mode of the present invention will now be described with reference to a structural diagram (right side of drawing) of the portable terminal apparatus according to the second embodiment mode of the present invention shown in FIG. 2(a), and VSWR (Voltage Standing-wave Ratio) characteristics indicated in FIG. 2(b) and FIG. 2(c).

Figure 2:
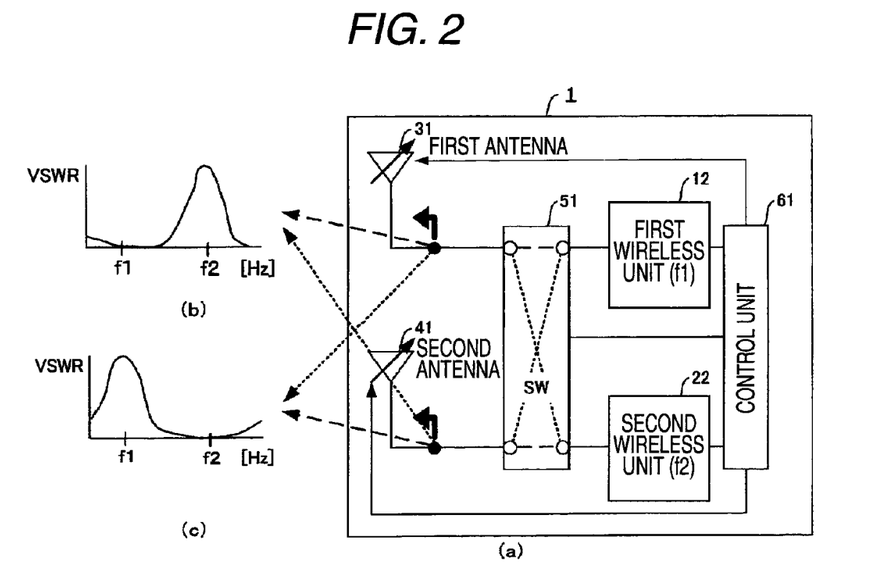
FIG. 2(a) is a structural diagram (right side of drawing) of a portable terminal apparatus according to a second embodiment mode of the present invention.
FIG. 2(b) and FIG. 2(c) indicate VSWR (Voltage Standing-wave Ratio) characteristics of antenna elements in the portable terminal apparatus of the second embodiment mode of the present invention.

As shown in FIG. 2(a), the portable terminal apparatus 1 according to the second embodiment mode of the present invention is arranged by containing a first antenna element 31, a second antenna element 41, a first wireless unit 12, a second wireless unit 22, a switch 51, and a control circuit 61. It should be understood that since reference numerals shown in the second embodiment mode are identical to those which are employed in order to explain the first embodiment and are commonly used in the second embodiment mode, descriptions thereof are omitted.

The first antenna element 31 and the second antenna element are constituted by, for example, an inverse F type antenna (line-shaped antenna, or plate-shaped antenna may be alternatively employed). The antenna structures of the first antenna element 31 and the second antenna element 41 are modified as an inverse F type antenna and an L type antenna (otherwise, monopole antenna) in response to shortcircuiting and opening of a shortcircuit portion thereof, so that antenna characteristics thereof are switched as explained in the below-mentioned description. That is to say, the antenna characteristics of the first antenna element 31 and the second antenna element 41 are switched to a VSWR characteristic indicated in FIG. 2(b), or another VSWR characteristic shown in FIG. 2(c) by modifying the antenna structures. Concretely speaking, as indicated in FIG. 2(b), as to one antenna structure of the first antenna element 31, an impedance characteristic in a use frequency range of the second wireless unit 22 is deteriorated in such a manner that a VSWR value is low at the frequency f1 of wireless electromagnetic waves used by the first wireless unit 12, whereas a VSWR value is high at the frequency f2 of wireless electromagnetic waves used by the second wireless unit 22. Also, as shown in FIG. 2(c), as to another antenna structure of the first antenna element, an impedance characteristic in a use frequency range of the first wireless unit 12 is deteriorated in such a manner that a VSWR value is high at the frequency f1 of wireless electromagnetic waves used by the first wireless unit 12, whereas a VSWR value is low at the frequency f2 of wireless electromagnetic waves used by the second wireless unit 22. Antenna characteristics of the second antenna element 41 are also switched in a similar manner to those of the first antenna element 31.

As represented in FIG. 2(a), the switch 51 has such a switching structure. That is, the switch 51 connects the first antenna element 31, with the first wireless unit 12, and the second antenna element 41, with the second wireless unit 22, respectively. Otherwise, the switch 51 connects the first antenna element 31 with the second wireless unit 22, and the second antenna element 41 with the first wireless unit 12, respectively. The switch 51 is arranged by, for instance, a DPDT (Double-Pole, Double-Throw) switch.

In response to switching operations of the switch 51, the control circuit 61 switches the structures of the first antenna element 31 and the second antenna element 41. For example, if the first antenna element 31 and the second antenna element 41 are constituted by an inverse F type antenna, then the control circuit 61 switches shortcircuiting and opening of the shortcircuit portions. In the case that the switch 51 has connected the first antenna element 31 with the first wireless unit 12 and the second antenna element 41 with the second wireless unit 22 in a pair, the control circuit 61 shortcircuits the shortcircuit portion of the first antenna element 31, and on the other hand, opens the shortcircuit portion of the second antenna element 41. Conversely, in such a case that the switch 51 has connected the first antenna element 31 with the second wireless unit 22 and the second antenna element 41 with the first wireless unit 12 in a pair, the control circuit 61 opens the shortcircuit portion of the first antenna element 31, and on the other hand, shortcircuits the shortcircuit portion of the second antenna element 41.

In accordance with the portable terminal apparatus of the second embodiment mode of the present invention, with respect to each of the antenna elements, since the impedance characteristic of the use frequency range has been deteriorated which is utilized by another wireless element, antenna coupling between the own antenna element and another antenna element can hardly occur. As a result, it is possible to reduce that the antenna characteristic is deteriorated. Also, when there are some differences in antenna performance (directivity, power gain etc. except for VSWR characteristic) of the respective antenna elements, a specific wireless unit having a certain wireless communication function can be connected to an antenna element having antenna performance that is suitable for this wireless communication. As a result, while the above-described effects can be maintained, the wireless communication can be carried out under more comfortable wireless communication environment.

It should also be understood that the second embodiment mode has described the portable terminal apparatus in which the respective antenna elements have been connected to the two wireless units. Alternatively, the second embodiment mode may be alternatively realized in such a case that the respective antenna elements are connected to 3, or more sets of wireless units, as follows: That is, while an antenna element may be modified into at least 3, or more pieces of antenna structures, different wireless units may be related to the respective antenna structures, and impedance characteristics in use frequency ranges of the remaining wireless units may be deteriorated in such a manner that a VSWR value is high at a frequency of wireless electromagnetic waves utilized by such a wireless unit to which the first-mentioned antenna structure has been applied, whereas VSWR values are low at frequencies of wireless electromagnetic waves utilized by the remaining wireless units. Also, the switch and the control unit connect the wireless units related to the correspondence relationship to the antenna elements so as to switch the structure of the antenna elements related to the correspondence relationship thereof.

Third Embodiment Mode

A portable terminal apparatus according to a third embodiment mode of the present invention will now be described with reference to a structural diagram (right side of drawing) of the portable terminal apparatus according to the third embodiment mode of the present invention shown in FIG. 3(a), and VSWR (Voltage Standing-wave Ratio) characteristics indicated in FIG. 3(b) and FIG. 3(c).

Figure 3:
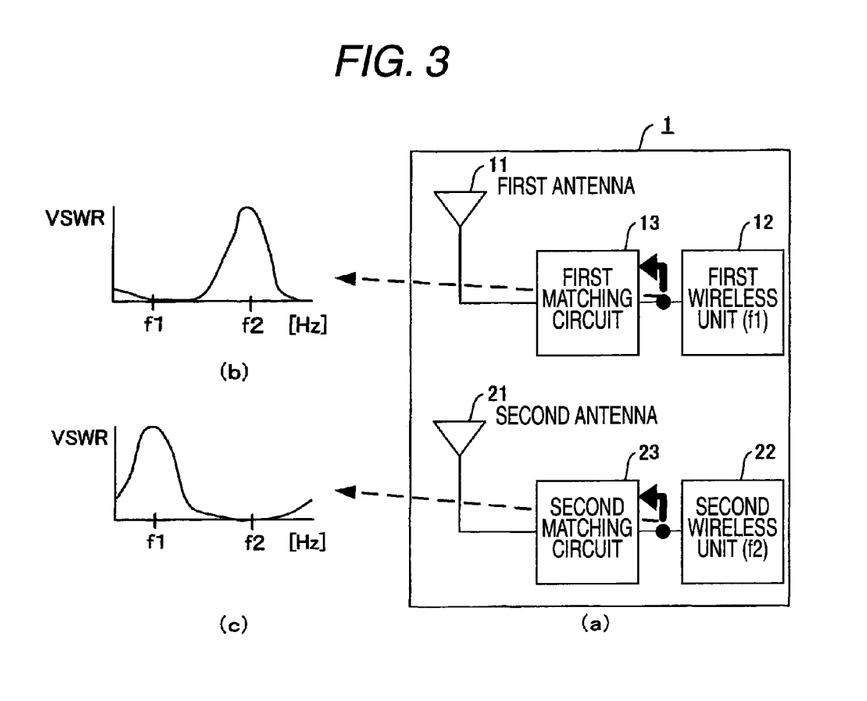
FIG. 3(a) is a structural diagram (right side of drawing) of a portable terminal apparatus according to a third embodiment mode of the present invention.
FIG. 3(b) and FIG. 3(c) represent VSWR (Voltage Standing-wave Ratio) characteristics after matching in the portable terminal apparatus of the third embodiment mode of the present invention.

As shown in FIG. 3(a), the portable terminal apparatus 1 according to the third embodiment mode of the present invention is arranged by containing a first antenna element 11, a second antenna element 21, a first wireless unit 12, a second wireless unit 22, a first matching circuit 13, and a second matching circuit 23. It should be understood that since reference numerals shown in the third embodiment mode are identical to those which are employed in order to explain the first embodiment and are commonly used in the third embodiment mode, descriptions thereof are omitted.

In the portable terminal apparatuses of the first and second embodiment modes of the present invention, the portable terminal apparatuses have been equipped with the first antenna element 11 and the second antenna element 21 (namely, antenna element having structures designed in such a way that impedance characteristics are partially deteriorated), the impedance characteristics of which have been partially deteriorated. In the portable terminal apparatus according to the third embodiment mode of the present invention, this portable terminal apparatus is arranged by employing matching circuits in order to partially deteriorate impedance characteristics of the first antenna element 11 and the second antenna element 12.

The first matching circuit 13 is connected to the first antenna element 11 and the first wireless unit 12 so as to match and adjust the impedance characteristic of the first antenna element 11, so that a VSWR characteristic of a first antenna unit constructed of the first antenna element 11 and the first matching circuit 13 becomes such a VSWR characteristic shown in FIG. 3(b). In other words, as to the first antenna unit, an impedance characteristic in a use frequency range of the second wireless unit 22 is deteriorated in such a manner that a VSWR value is low at the frequency f1 of wireless electromagnetic waves used by the first wireless unit 12, whereas a VSWR value is high at the frequency f2 of wireless electromagnetic waves used by the second wireless unit 22. The second matching circuit is connected to the second antenna element 21 and the second wireless unit 22 so as to match and adjust the impedance characteristic of the second antenna element 21, so that a VSWR characteristic of a second antenna unit constructed of the second antenna element 21 and the second matching circuit 23 becomes such a VSWR characteristic indicated in FIG. 3(c). That is to say, as to the second antenna unit, an impedance characteristic in a use frequency range of the first wireless unit 12 is deteriorated in such a manner that a VSWR value is high at the frequency f1 of wireless electromagnetic waves used by the first wireless unit 12, whereas a VSWR value is low at the frequency f2 of wireless, electromagnetic waves used by the second wireless unit 22.

In accordance with the portable terminal apparatus of the third embodiment mode of the present invention, with respect to each of the antenna elements, since the impedance characteristic of the use frequency range has been deteriorated which is utilized by another antenna element, antenna coupling between the own antenna element and another antenna element can hardly occur. As a result, it is possible to reduce that the antenna characteristic is deteriorated. Also, since the matching circuit performs the matching/adjusting operation so as to deteriorate the impedance characteristic of the specific frequency range of the antenna element, when such antenna elements utilized in the portable terminal apparatus of the present invention are designed, these antenna elements may be designed only by considering such a condition that a band width of a wireless communicatable operation by the antenna elements may contain each of the frequency ranges which are utilized in a plurality of wireless communications. As a result, the antenna elements may be designed in a simple manner.

It should also be noted that while a filter may be added between the first antenna element and the first matching circuit, or between the first matching circuit and the first wireless unit, otherwise between the second matching circuit and the second wireless unit, even when an impedance characteristic in each of predetermined frequency ranges may be deteriorated (namely, predetermined frequency range is cut off), a similar effect may be achieved.

Fourth Embodiment Mode

A portable terminal apparatus according to a fourth embodiment mode of the present invention will now be described with reference to a structural diagram (right side of drawing) of the portable terminal apparatus according to the fourth embodiment mode of the present invention shown in FIG. 4(a), and VSWR (Voltage Standing-wave Ratio) characteristics indicated in FIG. 4(b) and FIG. 4(c).

Figure 4:
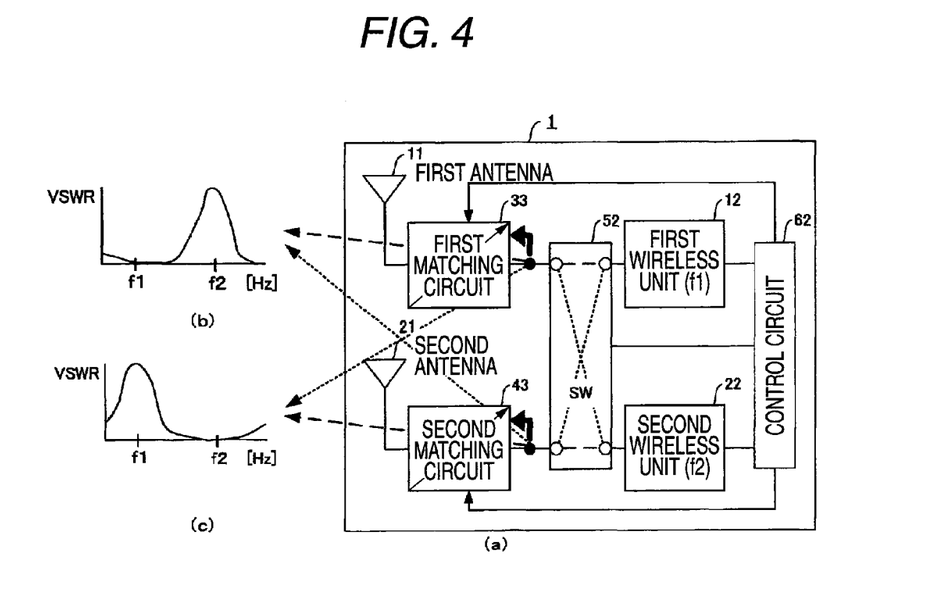
FIG. 4(a) is a structural diagram (right side of drawing) of a portable terminal apparatus according to a fourth embodiment mode of the present invention.
FIG. 4(b) and FIG. 4(c) represent VSWR (Voltage Standing-wave Ratio) characteristics after matching in the portable terminal apparatus of the fourth embodiment mode of the present invention.

As shown in FIG. 4(a), the portable terminal apparatus 1 according to the fourth embodiment mode of the present invention is arranged by containing a first antenna element 11, a second antenna element 21, a first wireless unit 12, a second wireless unit 22, a first matching circuit 33, a second matching circuit 43, a switch 52, and a control circuit 62. It should be understood that since reference numerals shown in the fourth embodiment mode are identical to those which are employed in order to explain the first embodiment and are commonly used in the fourth embodiment mode, descriptions thereof are omitted.

In the portable terminal apparatuses of the first and second embodiment modes of the present invention, the portable terminal apparatuses have been equipped with the first antenna element 11 and the second antenna element 21 (namely, antenna element having structures designed in such a way that impedance characteristics are partially deteriorated), the impedance characteristics of which have been partially deteriorated. In the portable terminal apparatus according to the fourth embodiment mode of the present invention, this portable terminal apparatus is arranged by employing matching circuits in order to partially deteriorate impedance characteristics of the first antenna element 11 and the second antenna element 12.

Figure 5:
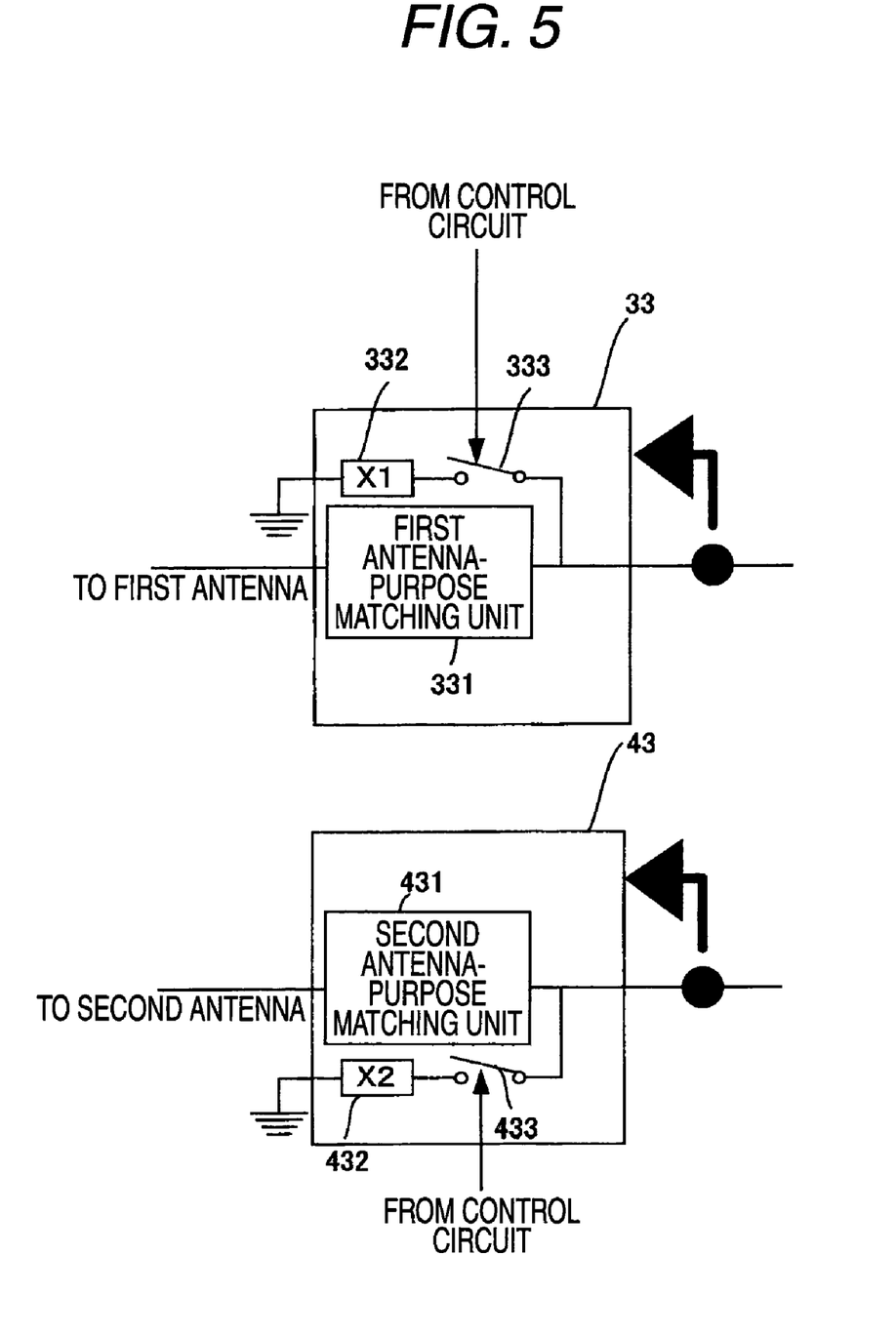
FIG. 5 is a structural diagram of a matching circuit in the portable terminal apparatus of the fourth embodiment mode of the present invention.

The first matching circuit 33 is arranged as indicated in FIG. 5. Since a switch 333 is brought into an open state in response to an instruction issued from the control circuit 62, a first antenna-purpose matching unit 331 matches/adjusts an impedance characteristic of the first antenna element 11 in order that a VSWR characteristic with respect to the first antenna element 11 is brought into such a VSWR characteristic shown in FIG. 4(b). Also, since the first matching circuit 33 brings the switch 333 into a close state in response to an instruction issued from the control circuit 62, both the first antenna-purpose matching circuit 331 and an impedance element (X1) 332 whose one terminal is grounded match/adjust the impedance characteristic of the first antenna element 11 in order that the VSWR characteristic with respect to the first antenna element 11 is brought into such a VSWR characteristic indicated in FIG. 4(c). It is so assumed that the impedance element 332 has been previously connected to such an impedance element by which the VSWR characteristic between the first antenna element 11 and the first antenna-purpose matching unit 331 becomes such a VSWR characteristic indicated in FIG. 4(c).

The second matching circuit 43 is also arranged as indicated in FIG. 5. Since a switch 433 is brought into an open state in response to an instruction issued from the control circuit 62, a second antenna-purpose matching unit 431 matches/adjusts an impedance characteristic of the second antenna element 21 in order that a VSWR characteristic with respect to the second antenna element 21 is brought into such a VSWR characteristic indicated in FIG. 4(c). Also, since the second matching circuit 43 brings the switch 433 into a close state in response to an instruction issued from the control circuit 62, both the second antenna-purpose matching circuit 431 and an impedance element (X2) 432 whose one terminal is grounded match/adjust the impedance characteristic of the second antenna element 21 in order that the VSWR characteristic with respect to the second antenna element 21 is brought into such a VSWR characteristic shown in FIG. 4(b). It is so assumed that the impedance element 432 has been previously connected to such an impedance element by which the VSWR characteristic between the second antenna element 21 and the second antenna-purpose matching unit 431 becomes such a VSWR characteristic represented in FIG. 4(b).

As indicated in FIG. 4(a), the switch 52 connects the first matching circuit 33 with the first wireless unit 12, and connects the second matching circuit 43 with the second wireless unit 22 as a pair. Otherwise, the switch 52 connects the first matching circuit 33 with the second wireless unit 22, and connects the second matching circuit 43 with the first wireless unit 12 as a pair. The switch 52 is arranged by, for example, a DPDT (Double-Pole, Double-Throw) switch.

In response to switching of the switch 52, the control circuit 62 switches opening/closing operations of the switches 333 and 433 provided in the matching circuit. In the case that the switch 52 has connected the first matching circuit 33 with the first wireless unit 12 and connected the second matching circuit 43 with the second wireless unit 22 in the pair, the control circuit 62 brings the switch 333 of the first matching circuit 33 into an open state, and on the other hand, brings the switch 433 of the second matching circuit 43 into an open state. Conversely, in the case that the switch 52 has connected the first matching circuit 33 with the second wireless unit 22 and connected the second matching circuit 43 with the first wireless unit 12 in the pair, the control circuit 62 brings the switch 333 of the first matching circuit 33 into a close state, and on the other hand, brings the switch 433 of the second matching circuit 43 into a close state.

In accordance with the portable terminal apparatus of the fourth embodiment mode of the present invention, with respect to each of the antenna elements, since the impedance characteristic of the use frequency range has been deteriorated which is utilized by another antenna element, antenna coupling between the own antenna element and another antenna element can hardly occur. As a result, it is possible to reduce that the antenna characteristic is deteriorated. Also, since the matching circuit performs the matching/adjusting operations so as to deteriorate the impedance characteristic of the specific frequency range of the antenna element, when such antenna elements utilized in the portable terminal apparatus of the present invention are designed, these antenna elements may be designed only by considering such a condition that a band width of a wireless communicatable operation by the antenna elements may contain each of the frequency ranges which are utilized in a plurality of wireless communications. As a result, the antenna elements may be designed in a simple manner. Also, when there are some differences in antenna performance (directivity, power gain etc. except for VSWR characteristic) of the respective antenna elements, a specific wireless unit having a certain wireless communication function can be connected to an antenna element having antenna performance that is suitable for this wireless communication. As a result, while the above-described effects can be maintained, the wireless communication can be carried out under more comfortable wireless communication environment.

It should also be noted that while a filter may be added between the first antenna element 11 and the first matching circuit 33, or between the second antenna element 12 and the second matching circuit 43, or between the first matching circuit 33 and the switch 52, or between the second matching circuit 43 and the switch 52, or between the switch 52 and the first wireless unit 12, otherwise between the switch 52 and the second wireless unit 22, even when an impedance characteristic in each of predetermined frequency ranges may be deteriorated (namely, predetermined frequency range is cut off), a similar effect may be achieved.

Fifth Embodiment Mode

A portable terminal apparatus according to a fifth embodiment mode of the present invention will now be described with reference to a structural diagram (right side of drawing) of the portable terminal apparatus according to the fifth embodiment mode of the present invention shown in FIG. 6(a), and VSWR (Voltage Standing-wave Ratio) characteristics indicated in FIG. 6(b) and FIG. 6(c).

As shown in FIG. 6(a), the portable terminal apparatus 1 according to the fifth embodiment mode of the present invention is arranged by containing a first antenna element 11, a second antenna element 21, a first wireless unit 12, a second wireless unit 22, a first matching circuit 33, a second matching circuit 43, a switch 53, and a control circuit 63. It should be understood that since reference numerals shown in the fifth embodiment mode are identical to those which are employed in order to explain the fourth embodiment and are commonly used in the fifth embodiment mode, descriptions thereof are omitted.

In the portable terminal apparatus according to the fourth embodiment mode of the present invention, the switch 52 has been arranged between the matching circuits 33, 43 and the wireless units 12, 22 so as to switch the connections between these circuit units. In the portable terminal apparatus according to the fifth embodiment mode, the switch 53 is arranged between the antenna elements 11, 21 and the matching circuits 33, 43 so as to switch connections between these circuit units. As a consequence, in the fourth embodiment mode, the first matching circuit 33 (otherwise, second matching circuit 43) has switched the VSWR characteristic with respect to the first antenna element 11 (otherwise, second antenna element 21) in response to the wireless units 12 and 22 to be connected into either FIG. 4(b) or FIG. 4(c). In contrast thereto, in the fifth embodiment mode, the impedance characteristics of the antenna elements 11 and 21 are matched and adjusted in order that a VSWR characteristic with respect to the antenna elements 11 and 21 to be connected is unified to the VSWR characteristic of FIG. 6(b) (otherwise, VSWR characteristic of FIG. 6(c)).

Figure 6:
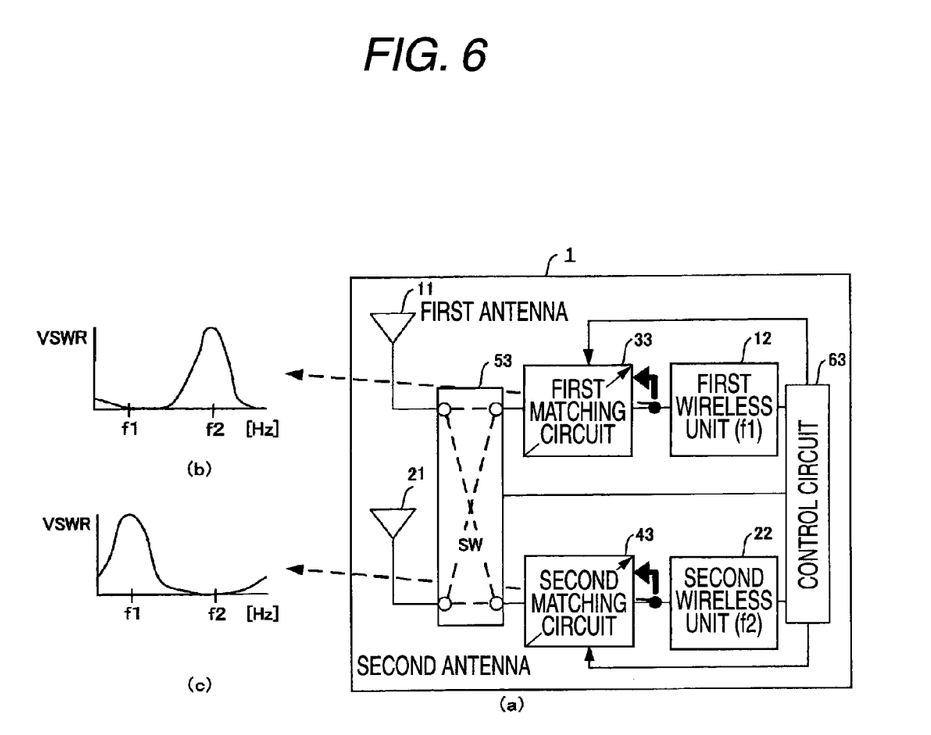
FIG. 6(a) is a structural diagram (right side of drawing) of a portable terminal apparatus according to a fifth embodiment mode of the present invention.
FIG. 6(b) and FIG. 6(c) represent VSWR (Voltage Standing-wave Ratio) characteristics after matching in the portable terminal apparatus of the fifth embodiment mode of the present invention.
Figure 7:
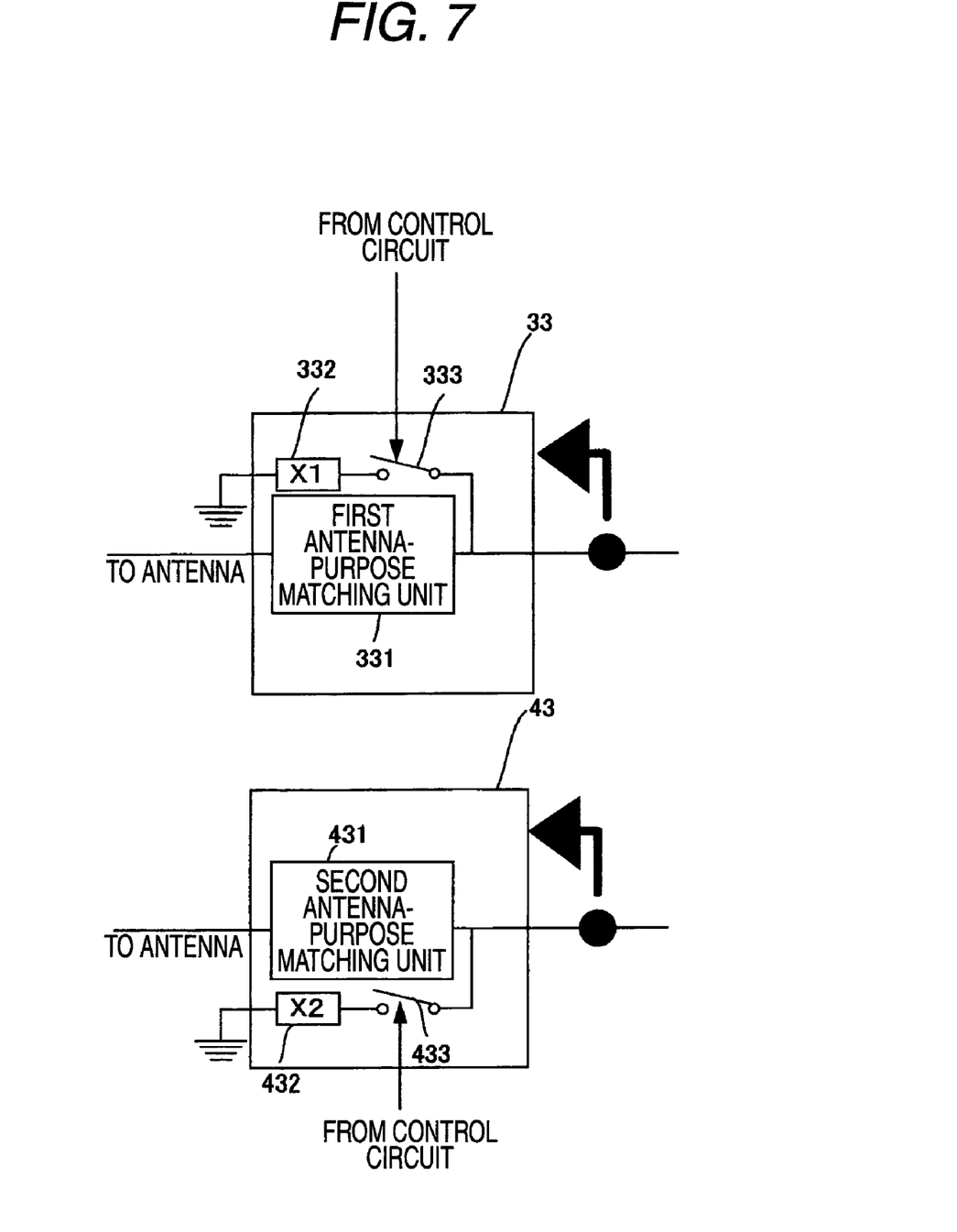
FIG. 7 is a structural diagram of a matching circuit in the portable terminal apparatus of the fifth embodiment mode of the present invention.

The first matching circuit 33 is arranged as indicated in FIG. 7. Since a switch 333 is brought into an open state in response to an instruction issued from the control circuit 62, a first antenna-purpose matching unit 331 matches/adjusts an impedance characteristic of the first antenna element 11 in order that a VSWR characteristic with respect to the first antenna element 11 is brought into such a VSWR characteristic shown in FIG. 6(b). Also, since the first matching circuit 33 brings the switch 333 into a close state in response to an instruction issued from the control circuit 62, both the first antenna-purpose matching circuit 331 and an impedance element (X1) 332 whose one terminal is grounded match/adjust the impedance characteristic of the second antenna element 21 in order that the VSWR characteristic with respect to the second antenna element 21 is brought into such a VSWR characteristic indicated in FIG. 6(b) (at this time, second antenna element 21 has been connected to first matching circuit 33 by switch 53). It is so assumed that the impedance element 332 has been previously connected to such an impedance element by which the VSWR characteristic between the second antenna element 21 and the first antenna-purpose matching unit 331 becomes such a VSWR characteristic indicated in FIG. 6(b).

The second matching circuit 43 is also arranged as indicated in FIG. 7. Since a switch 433 is brought into an open state in response to an instruction issued from the control circuit 62, a second antenna-purpose matching unit 431 matches/adjusts an impedance characteristic of the second antenna element 21 in order that a VSWR characteristic with respect to the second antenna element 21 is brought into such a VSWR characteristic indicated in FIG. 7(c). Also, since the second matching circuit 43 brings the switch 433 into a close state in response to an instruction issued from the control circuit 62, both the second antenna-purpose matching circuit 431 and an impedance element (X2) 432 whose one terminal is grounded match/adjust the impedance characteristic of the first antenna element 11 in order that the VSWR characteristic with respect to the first antenna element 11 is brought into such a VSWR characteristic shown in FIG. 6(*c*) (at this time, first antenna element 11 has been connected to second matching circuit 43 by switch 53). It is so assumed that the impedance element 432 has been previously connected to such an impedance element by which the VSWR characteristic between the first antenna element 11 and the second antenna-purpose matching unit 431 becomes such a VSWR characteristic represented in FIG. 6(*c*).

As indicated in FIG. 6(*a*), the switch 53 connects the first antenna element 11 with the first matching circuit 33, and connects the second antenna element 21 with the second matching circuit 43 as a pair. Otherwise, the switch 53 connects the first antenna element 11 with the second matching circuit 43, and connects the second antenna element 21 with the first matching circuit 33 as a pair. The switch 53 is arranged by, for example, a DPDT (Double-Pole, Double-Throw) switch.

In response to switching of the switch 53, the control circuit 63 switches opening/closing operations of the switches 333 and 433 provided in the matching circuit. In the case that the switch 53 has connected the first antenna element 11 with the first matching circuit 33 and connected the second antenna element 21 with the second matching circuit 43 in the pair, the control circuit 62 brings the switch 333 of the first matching circuit 33 into an open state, and on the other hand, brings the switch 433 of the second matching circuit 43 into an open state. Conversely, in the case that the switch 52 has connected the first antenna element 11 with the second matching circuit 43 and connected the second antenna element 21 with the first matching circuit 33 in the pair, the control circuit 62 brings the switch 333 of the first matching circuit 33 into a close state, and on the other hand, brings the switch 433 of the second matching circuit 43 into a close state.

In accordance with the portable terminal apparatus of the fifth embodiment mode of the present invention, with respect to each of the antenna elements, since the impedance characteristic of the use frequency range has been deteriorated which is utilized by another antenna element, antenna coupling between the own antenna element and another antenna element can hardly occur. As a result, it is possible to reduce that the antenna characteristic is deteriorated. Also, since the matching circuit performs the matching/adjusting operations so as to deteriorate the impedance characteristic of the specific frequency range of the antenna element, when such antenna elements utilized in the portable terminal apparatus of the present invention are designed, these antenna elements may be designed only by considering such a condition that a band width of a wireless communicatable operation by the antenna elements may contain each of the frequency ranges which are utilized in a plurality of wireless communications. As a result, the antenna elements may be designed in a simple manner. Also, when there are some differences in antenna performance (directivity, power gain etc. except for VSWR characteristic) of the respective antenna elements, a specific wireless unit having a certain wireless communication function can be connected to an antenna element having antenna performance that, is suitable for this wireless communication. As a result, while the above-described effects can be maintained, the wireless communication can be carried out under more comfortable wireless communication environment.

It should also be noted that while a filter may be added between the first antenna element 11 and the switch 53, or between the second antenna element 12 and the switch 53, or between the first matching circuit 33 and the switch 53, or between the second matching circuit 43 and the switch 53, or between the first matching circuit 33 and the first wireless unit 12, otherwise between the second matching circuit 43 and the second wireless unit 22, even when an impedance characteristic in each of predetermined frequency ranges may be deteriorated (namely, predetermined frequency range is cut off), a similar effect may be achieved.

Also, in the fifth embodiment mode, more specifically, when the antenna elements 11 and 21 have the substantially same antenna performance, the matching circuits 33 and 34 may merely perform similar matching and adjusting operations with respect to the antenna elements 11 and 21 connected thereto in order that the impedance characteristic with respect to the antenna elements 11 and 21 is brought into a predetermined characteristic (namely, since impedance elements 332 and 432 shown in FIG. 7 need not be employed). As a result, the switches 333 and 433 need not be opened/closed in response to an instruction issued from the control circuit 63. As a consequence, the control circuit 63 is no longer provided, so that the portable terminal apparatus of the present invention can be made compact.

Sixth Embodiment Mode

A portable terminal apparatus according to a sixth embodiment mode of the present invention will now be described with reference to a structural diagram (right side of drawing) of the portable terminal apparatus according to the sixth embodiment mode of the present invention shown in FIG. 8(*a*); and VSWR (Voltage Standing-wave Ratio) characteristics indicated in FIG. 8(*b*) and FIG. 8(*c*).

Figure 8:
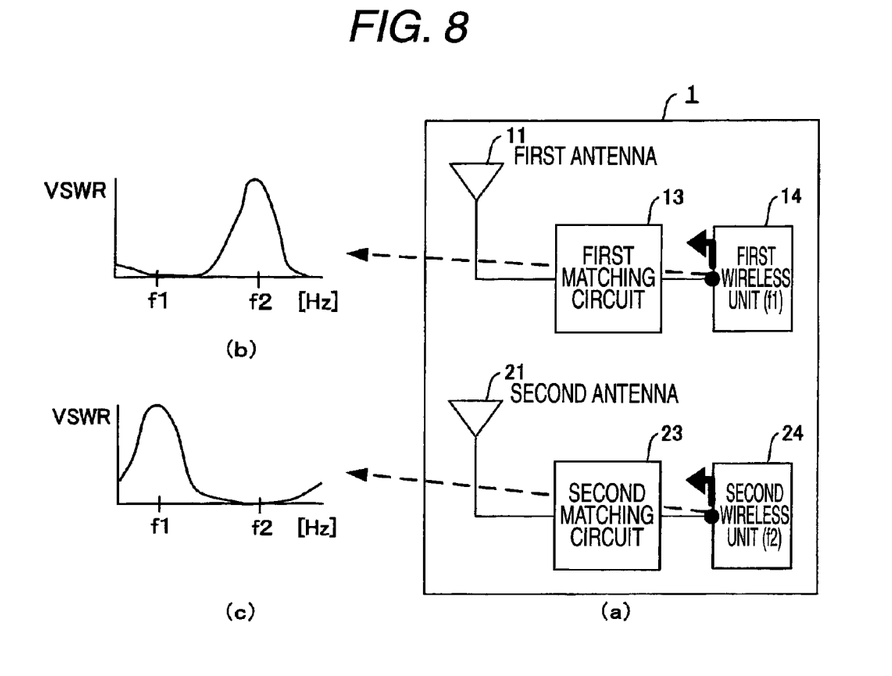
FIG. 8(a) is a structural diagram (right side of drawing) of a portable terminal apparatus according to a sixth embodiment mode of the present invention.
FIG. 8(b) and FIG. 8(c) represent VSWR (Voltage Standing-wave Ratio) characteristics after matching in the portable terminal apparatus of the sixth embodiment mode of the present invention.

As shown in FIG. 8(*a*), the portable terminal apparatus 1 according to the sixth embodiment mode of the present invention is arranged by containing a first antenna element 11, a second antenna element 21, a first wireless unit 14, a second wireless unit 24, a first matching circuit 13, and a second matching circuit 23. It should be understood that since reference numerals shown in the sixth embodiment mode are identical to those which are employed in order to explain the third embodiment and are commonly used in the sixth embodiment mode, descriptions thereof are omitted.

In the portable terminal apparatus according to the sixth embodiment mode of the present invention, this portable terminal apparatus is arranged by employing the wireless units 14 and 24 in order to partially deteriorate impedance characteristics of the first antenna element 11 and the second antenna element 21, while low noise amplifiers (LNAs) are mounted, the input impedance characteristics of which can be adjusted.

The first wireless unit 14 adjusts the own input impedance characteristic so as to bring an impedance characteristic of a first antenna unit into such a VSWR characteristic shown in FIG. 8(*b*), while the first antenna unit is constituted by the first antenna element 11, the first matching circuit 13, and the first wireless unit 14. In other words, as to the first antenna unit, an impedance characteristic in a use frequency range of the second wireless unit 24 is deteriorated in such a manner that a VSWR value is low at the frequency f1 of wireless electromagnetic waves used by the first wireless unit 14, whereas a VSWR value is high at the frequency f2 of wireless electromagnetic waves used by the second wireless unit 24. The second wireless unit 24 adjusts the own input impedance characteristic so as to bring an impedance characteristic of a second antenna unit into such a VSWR characteristic shown in FIG. 8(*c*), while the second antenna unit is constituted by the second antenna element 21, the second matching circuit 23, and the second wireless unit 24. That is to say, as to the second antenna unit, an impedance characteristic in a use frequency range of the first wireless unit 14 is deteriorated in such a manner that a VSWR value is high at the frequency f1 of wireless electromagnetic waves used by the first wireless unit 14, whereas a VSWR value is low at the frequency f2 of wireless electromagnetic waves used by the second wireless unit 24.

In accordance with the portable terminal apparatus of the sixth embodiment mode of the present invention, with respect to each of the antenna elements, since the impedance characteristic of the use frequency range has been deteriorated which is utilized by another antenna element, antenna coupling between the own antenna element and another antenna element can hardly occur. As a result, it is possible to reduce that the antenna characteristic is deteriorated. Also, since the matching circuit performs the matching/adjusting operation so as to deteriorate the impedance characteristic of the specific frequency range of the antenna element, when such antenna elements utilized in the portable terminal apparatus of the present invention are designed, these antenna elements may be designed only by considering such a condition that a band width of a wireless communicatable operation by the antenna elements may contain each of the frequency ranges which are utilized in a plurality of wireless communications. As a result, the antenna elements may be designed in a simple manner.

Seventh Embodiment Mode

A portable terminal apparatus according to a seventh embodiment mode of the present invention will now be described with reference to a structural diagram (right side of drawing) of the portable terminal apparatus according to the seventh embodiment mode of the present invention shown in FIG. 9(a), and VSWR (Voltage Standing-wave Ratio) characteristics indicated in FIG. 9(b) and FIG. 9(c).

Figure 9:
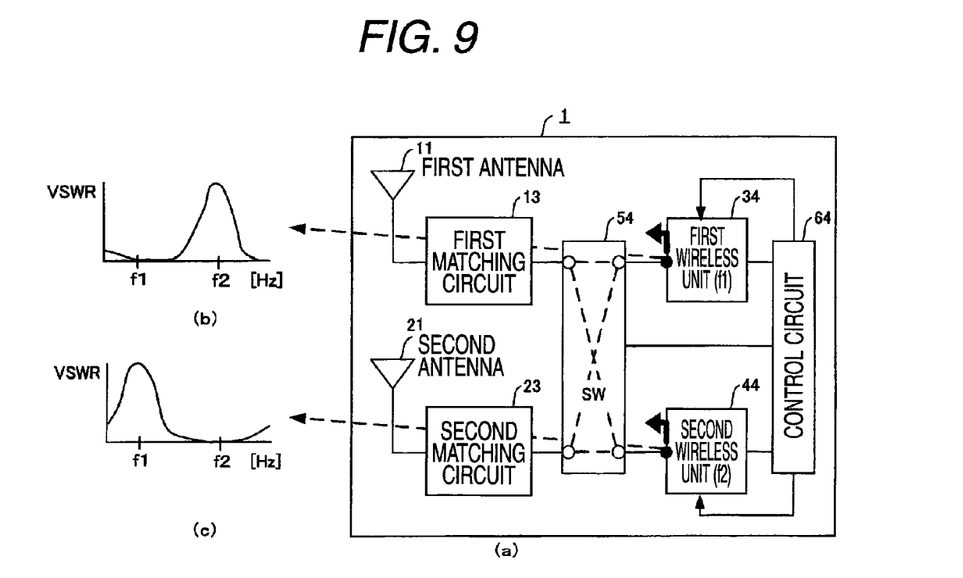
FIG. 9(a) is a structural diagram (right side of drawing) of a portable terminal apparatus according to a seventh embodiment mode of the present invention.
FIG. 9(b) and FIG. 9(c) represent VSWR (Voltage Standing-wave Ratio) characteristics after matching in the portable terminal apparatus of the seventh embodiment mode of the present invention.

As shown in FIG. 9(a), the portable terminal apparatus 1 according to the seventh embodiment mode of the present invention is arranged by containing a first antenna element 11, a second antenna element 21, a first wireless unit 34, a second wireless unit 44, a first matching circuit 13, a second matching circuit 23, a switch 54, and a control circuit 64. It should be understood that since reference numerals shown in the seventh embodiment mode are identical to those which are employed in order to explain the third embodiment and are commonly used in the seventh embodiment mode, descriptions thereof are omitted.

In the portable terminal apparatus according to the seventh embodiment mode of the present invention, this portable terminal apparatus is arranged by employing the wireless units 34 and 44 in order to partially deteriorate impedance characteristics of the first antenna element 11 and the second antenna element 21, while low noise amplifiers (LNAs) are mounted, the input impedance characteristics of which can be adjusted.

In response to an instruction issued from the control circuit 64, the first wireless unit 34 adjusts the input impedance characteristic thereof in order that either an impedance characteristic from the first antenna element 11 to the first wireless unit 34 or another impedance characteristic from the second antenna element 21 to the first wireless unit 34 is switched to such a VSWR characteristic shown in FIG. 9(b). Also, in response to an instruction issued from the control circuit 64, the second wireless unit 44 adjusts the input impedance characteristic thereof in order that either an impedance characteristic from the first antenna element 11 to the second wireless unit 44 or another impedance characteristic from the second antenna element 21 to the second wireless unit 44 is switched to such a VSWR characteristic shown in FIG. 9(c).

As indicated in FIG. 9(a), the switch 54 connects the first matching circuit 13 with the first wireless unit 34, and connects the second matching circuit 23 with the second wireless unit 44 as a pair. Otherwise, the switch 54 connects the first matching circuit 13 with the second wireless unit 44, and connects the second matching circuit 23 with the first wireless unit 34 as a pair.

In response to switching operation of the switch 54, the control circuit 64 sends out an instruction for adjusting an input impedance characteristic to both the first wireless unit 34 and the second wireless unit 44. In such a case that the switch 54 has connected the first matching circuit 13 with the first wireless unit 34, and has connected the second matching circuit 23 with the second wireless unit 44 as the pair, the control circuit 64 sends out such an instruction for adjusting the impedance characteristic from the first antenna element 11 to the first wireless unit 34 for such a VSWR characteristic shown in FIG. 9(b) to the first wireless unit 34, and on the other hand, the control circuit 64 sends out another instruction for adjusting the impedance characteristic from the second antenna element 21 to the second wireless unit 44 for such a VSWR characteristic shown in FIG. 9(c) to the second wireless unit 44. Conversely, in such a case that the switch 54 has connected the first matching circuit 13 with the second wireless unit 44, and has connected the second matching circuit 23 with the first wireless unit 34 as the pair, the control circuit 62 sends out such an instruction for adjusting the impedance characteristic from the second antenna element 21 to the first wireless unit 34 for such a VSWR characteristic shown in FIG. 9(b) to the first wireless unit 34, and on the other hand, the control circuit 62 sends out another instruction for adjusting the impedance characteristic from the first antenna element 11 to the second wireless unit 44 for such a VSWR characteristic shown in FIG. 9(c) to the second wireless unit 44.

In accordance with the portable terminal apparatus of the fourth embodiment mode of the present invention, with respect to each of the antenna elements, since the impedance characteristic of the use frequency range has been deteriorated which is utilized by another antenna element, antenna coupling between the own antenna element and another antenna element can hardly occur. As a result, it is possible to reduce that the antenna characteristic is deteriorated. Also, since the wireless unit performs the matching/adjusting operations so as to deteriorate the impedance characteristic of the specific frequency range of the antenna element, when such antenna elements utilized in the portable terminal apparatus of the present invention are designed, these antenna elements may be designed only by considering such a condition that a band width of a wireless communicatable operation by the antenna elements may contain each of the frequency ranges which are utilized in a plurality of wireless communications. As a result, the antenna elements may be designed in a simple manner. Also, when there are some differences in antenna performance (directivity, power gain etc. except for VSWR characteristic) of the respective antenna elements, a specific wireless unit having a certain wireless communication function can be connected to an antenna element having antenna performance that is suitable for this wireless communication. As a result, while the above-described effects can be maintained, the wireless communication can be carried out under more comfortable wireless communication environment. Also, since the portable terminal apparatus is arranged in such a manner that the instruction is electrically sent out from the control circuit to the wireless unit (since switching circuit is not provided similar to second and fourth embodiment modes), the portable terminal apparatus can be easily made in an integrated circuit.

INDUSTRIAL APPLICABILITY

The portable terminal apparatus of the present invention has such an effect that even when the portable terminal apparatus of the present invention simultaneously performs the plurality of wireless communication functions by utilizing the plurality of antennas, the portable terminal apparatus can reduce that the antenna characteristics of the respective antennas are deteriorated due to the antenna coupling phenomena. The portable terminal apparatus of the present invention has a merit in such a field of a portable terminal apparatus that is required to perform a plurality of wireless communication functions at the same time by utilizing a plurality of antennas.

While the present invention has been described in detail with reference to the specific embodiment modes, it is apparent for an ordinarily skilled engineer who can readily modify and/or change these embodiment modes in various manners without departing from the technical scope and spirit of the present invention.

The invention claimed is:

1. A portable terminal apparatus comprising:
   a first wireless unit configured to perform a wireless communication by utilizing electromagnetic waves of a first frequency range, the first wireless unit having a first impedance characteristic; and
   a second wireless unit configured to perform a wireless communication by utilizing electromagnetic waves of a second frequency range that is different from the first frequency range, the second wireless unit having a second impedance characteristic,
   wherein the first impedance characteristic in the first frequency range is lower than the second impedance characteristic in the first frequency range, and the second impedance characteristic in the second frequency range is lower than the first impedance characteristic in the second frequency range.

2. The portable terminal apparatus of claim 1, wherein the first impedance characteristic corresponds to a first VSWR (Voltage Standing Wave Ratio) that includes a first VSWR value in the first frequency range that is less than or equal to a first value and a second VSWR value in the second frequency range that is greater than or equal to a second value; and
   the second impedance characteristic corresponds to a second VSWR that includes a third VSWR value in the second frequency range that is less than or equal to the first value and a fourth VSWR value in the first frequency range that is greater than or equal to the second value.

3. The portable terminal apparatus of claim 1, further comprising:
   a selecting switch configured to connect any one of a first antenna element and a second antenna element to the first wireless unit, and connect the first antenna element or second antenna element that is not connected to the first wireless unit to the second wireless unit; and
   wherein when either the first antenna element or second antenna element has been connected to the first wireless unit, an impedance characteristic of the first antenna element or second antenna element is switched to the first impedance characteristic, and when the first antenna element or second antenna element has been connected to the second wireless unit, the impedance characteristic of the first antenna element or second antenna element is switched to the second impedance characteristic.

4. A portable terminal apparatus comprising:
   a first wireless unit configured to perform a wireless communication by utilizing electromagnetic waves of a first frequency range, the first wireless unit including a first antenna element;
   a second wireless unit configured to perform a wireless communication by utilizing electromagnetic waves of a second frequency range that is different from the first frequency range, the second wireless unit including a second antenna element;
   a first impedance adjusting unit connected to the first wireless unit, including a first matching circuit or a first filter, the first impedance adjusting unit configured to adjust a first impedance characteristic with respect to the first wireless unit; and
   a second impedance adjusting unit connected to the second wireless unit, including a second matching circuit or a second filter, the second impedance adjusting unit configured to adjust a second impedance characteristic with respect to the second wireless unit,
   wherein the first impedance characteristic in the first frequency range is associated with the first antenna element and is lower than the second impedance characteristic in the first frequency range, the second impedance characteristic in the second frequency range is associated with the second antenna element and is lower than the first impedance characteristic in the second frequency range.

5. The portable terminal apparatus of claim 4, wherein the first impedance characteristic corresponds to a first VSWR (Voltage Standing Wave Ratio) that includes a first VSWR value in the first frequency range that is less than or equal to a first value and a second VSWR value in the second frequency range that is greater than or equal to a second value; and
   the second impedance characteristic corresponds to a second VSWR that includes a third VSWR value in the second frequency range that is less than or equal to the first value and a fourth VSWR value in the first frequency range that is greater than or equal to the second value.

6. The portable terminal apparatus of claim 4, further comprising:
   a selecting switch configured to connect any one of the first impedance adjusting unit and the second impedance adjusting unit to the first wireless unit, and connect the first impedance adjusting unit or second impedance adjusting unit that is not connected to the first wireless unit to the second wireless unit; and
   wherein when either the first impedance adjusting unit or second impedance adjusting unit has been connected to the first wireless unit, the first impedance adjusting unit or second impedance adjusting unit adjusts the first impedance characteristic, and when the first impedance adjusting unit or second impedance adjusting unit has been connected to the second wireless unit, the first impedance adjusting unit or second impedance adjusting unit adjusts the second impedance characteristic.

7. A portable terminal apparatus comprising:
   a first wireless unit including a first antenna element, the first wireless unit configured to perform a wireless communication by utilizing electromagnetic waves of a first frequency range and to adjust a first impedance characteristic with respect to the first antenna element; and a second wireless unit including a second antenna element, the second wireless unit configured to perform a wireless communication by utilizing electromagnetic waves of a second frequency range that is different from the first frequency range and to adjust a second impedance characteristic with respect to the second antenna element, wherein the first impedance characteristic in the first frequency range is lower than the second impedance characteristic in the first frequency range, and the second impedance characteristic in the second frequency range is lower than the first impedance characteristic in the second frequency range.

8. The portable terminal apparatus of claim 7, wherein the first impedance characteristic corresponds to a first VSWR (Voltage Standing Wave Ratio) that includes a first VSWR value in the first frequency range that is less than or equal to a first value and a second VSWR value in the second frequency range that is greater than or equal to a second value; and the second impedance characteristic corresponds to a second VSWR that includes a third VSWR value in the second frequency range that is less than or equal to the first value and a fourth VSWR value in the first frequency range that is greater than or equal to the second value.

9. The portable terminal apparatus of claim 7, further comprising:

a selecting switch configured to connect any one of the first antenna element and the second antenna element to the first wireless unit, and connect the first antenna element or second antenna element that is not connected to the first wireless unit to the second wireless unit; and wherein when either the first antenna element or second antenna element has been connected to the first wireless unit, the first wireless unit adjusts an impedance characteristic with respect to the first antenna element or second antenna element to the first impedance characteristic based on an input impedance characteristic of the first wireless unit, and when the first antenna element or second antenna element has been connected to the second wireless unit, the second wireless unit adjusts an impedance characteristic with respect to the first antenna element or second antenna element to the second impedance characteristic based on an input impedance characteristic of the second wireless unit.

* * * * *